United States Patent
Pursifull et al.

(10) Patent No.: US 9,027,536 B2
(45) Date of Patent: May 12, 2015

(54) CRANKCASE VENTILATION AND VACUUM GENERATION

(75) Inventors: Ross Dykstra Pursifull, Dearborn, MI (US); Nicholas Dashwood Crisp, Leigh-on-Sea (GB); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 13/533,871

(22) Filed: Jun. 26, 2012

(65) Prior Publication Data

US 2013/0340732 A1     Dec. 26, 2013

(51) Int. Cl.
| | |
|---|---|
| *F02B 25/06* | (2006.01) |
| *F01M 13/02* | (2006.01) |
| *F02M 35/10* | (2006.01) |
| *F02M 25/06* | (2006.01) |
| *F02B 37/00* | (2006.01) |

(52) U.S. Cl.
CPC ....... *F01M 13/023* (2013.01); *F02M 35/10222* (2013.01); *F02M 35/10229* (2013.01); *F02B 37/00* (2013.01); *F02M 25/06* (2013.01); *Y02T 10/121* (2013.01)

(58) Field of Classification Search
CPC ...... F02M 25/06; F01M 13/023; F01M 13/00
USPC ................................. 123/572–574
See application file for complete search history.

(56) References Cited

U.S. PATENT DOCUMENTS

| | | | |
|---|---|---|---|
| 5,429,101 A | 7/1995 | Uebelhoer et al. | |
| 5,499,616 A | 3/1996 | Enright | |
| 5,910,098 A | 6/1999 | Harima | |
| 6,047,670 A | 4/2000 | Stella et al. | |
| 6,425,356 B1 | 7/2002 | Pischinger et al. | |
| 6,575,022 B1 * | 6/2003 | Schneider et al. | 73/114.01 |
| 6,779,388 B2 | 8/2004 | Baeuerle et al. | |
| 7,290,536 B2 * | 11/2007 | Lindmark et al. | 123/572 |
| 7,523,748 B2 | 4/2009 | Hirano et al. | |
| 7,562,652 B2 * | 7/2009 | Hommes et al. | 123/572 |
| 7,610,140 B2 | 10/2009 | Hirooka | |
| 7,650,221 B2 | 1/2010 | Oi et al. | |
| 7,886,727 B2 * | 2/2011 | Ulrey et al. | 123/568.15 |
| 7,900,612 B2 * | 3/2011 | Knaus et al. | 123/574 |
| 2008/0072979 A1 * | 3/2008 | Rosenbaum et al. | 138/39 |
| 2008/0103667 A1 | 5/2008 | Suzuki et al. | |
| 2009/0056687 A1 * | 3/2009 | Pien | 123/73 R |
| 2009/0090337 A1 * | 4/2009 | Asanuma et al. | 123/574 |
| 2009/0320809 A1 | 12/2009 | Ruppel et al. | |
| 2010/0300413 A1 | 12/2010 | Ulrey et al. | |
| 2011/0073083 A1 * | 3/2011 | Shiraishi et al. | 123/574 |

FOREIGN PATENT DOCUMENTS

| | | |
|---|---|---|
| EP | 0930431 A2 | 1/1999 |
| EP | 1959117 A1 | 12/2006 |

* cited by examiner

*Primary Examiner* — Marguerite McMahon
*Assistant Examiner* — James Kim
(74) *Attorney, Agent, or Firm* — Julia Voutyras; Alleman Hall McCoy Russell & Tuttle LLP (57) ABSTRACT

Methods and systems are provided for generating vacuum from crankcase ventilation flow. During both directions of gas flow between an engine intake manifold and a crankcase, gases are directed through one or more aspirators to produce vacuum. The drawn vacuum may then be used to operate various engine vacuum actuators.

13 Claims, 6 Drawing Sheets

CRANKCASE VENTILATION AND VACUUM GENERATION

TECHNICAL FIELD

This application relates to using crankcase ventilation for vacuum generation during boosted and un-boosted engine operation via the use of a variable venturi.

BACKGROUND AND SUMMARY

Vehicles may include various actuators that operate using a source of vacuum. The vacuum actuators may be used for actuation, enabling vehicle brakes, purging a fuel canister, improving an engine start, performing a leak test, etc. Accordingly, various vacuum sources may be available on the vehicle. These may include dedicated vacuum pumps as well as vacuum generating ejectors, aspirators, and venturis. Engine control systems may harness an air flow through the ejector/aspirator/venturi to produce a vacuum which is then used for the various actuators.

One example approach for directing a flow through an ejector to generate vacuum is shown by Suzuki et al. in US2008/0103667. Therein, an air ejector is coupled in a surge tank upstream of a branched intake manifold having air intake throttles in each branch. A mixture of intake air and crankcase gases flowing to the intake manifold is used as motive flow to create vacuum at the ejector, the vacuum then directed to a brake booster. A ratio of intake air relative to PCV gas directed through the ejector is controlled by a negative pressure regulating valve upstream of the ejector. In particular, air is combined with the crankcase gases in the closed crankcase ventilation system to amplify the intake vacuum generated for brake boosting.

However the inventors herein have identified potential issues with such an approach. As one example, the configuration of Suzuki et al. relies on PCV flow in a direction from the intake manifold to the crankcase to generate vacuum at the ejector. However, during selected engine operating conditions, such as during engine idling conditions in an open crankcase ventilation system, PCV flow may not be in the direction relied upon, but rather in an opposite direction from the crankcase to the intake manifold. As another example, the air flow rate through the ejector required to generate sufficient vacuum flow rate may interfere with the minimum controllable air flow budget due to more air flowing than the engine needs. In addition, the required air flow rate can also interfere with air-fuel ratio control. Further still, the system of Suzuki requires complex co-ordination between the negative pressure regulating valve and the throttle valves of the intake manifold to enable engine air control.

In one example, some of the above issues may be addressed by a method of operating an engine comprising flowing gasses, in both directions, through a positive crankcase ventilation (PCV) line, between an intake manifold and a crankcase via a variable venturi to generate vacuum at the venturi. In this way, irrespective of the direction of flow through the PCV line, vacuum may be generated for subsequent use.

For example, one or more aspirators, ejectors, and/or variable venturis may be positioned between an engine intake manifold and a crankcase, in a PCV line. Based on the direction of flow in the PCV line between the intake manifold and the crankcase, air and/or crankcase gases may be directed through an aspirator, and a vacuum may be generated at the aspirator. For example, during conditions when intake manifold pressure (MAP) is higher than barometric pressure (BP), air may flow through the PCV line from the intake manifold to the crankcase via a first (e.g., bi-directional) aspirator. Then, during conditions when MAP is lower than BP, crankcase gases may flow through the PCV line from the crankcase to the intake manifold via a second (e.g., uni-directional) aspirator. In addition, some crankcase gases may flow via the first, bi-directional aspirator. Thus during both directions of flow through the PCV line, the flow of air or crankcase gases via the venturi generates a vacuum that is drawn into and stored in a vacuum reservoir. In one example, the uni-directional aspirator may be a variable throat area venturi and a flow rate of crankcase gases through the venturi can be adjusted by adjusting a throat area of the venturi.

In this way, by enabling flow of intake air and/or crankcase gases through a venturi/aspirator/ejector irrespective of the direction of flow through a PCV line, flow during both boosted and un-boosted engine conditions can be advantageously used to generate vacuum. In other words, a much broader window for vacuum generation is enabled, and engine vacuum generation efficiency is improved. By enabling vacuum generation to be enabled at a wider range of airflow rates, the minimum controllable airflow budget of the engine is not affected. Likewise, engine air-fuel ratio control is also not affected. By improving vacuum generation from PCV flow during idle engine conditions, idle air flow rate control is also improved. In addition, a rate of PCV flow through a crankcase oil separator can be maintained substantially constant, thereby improving PCV flow oil separation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for flowing air and/or crankcase gases in a positive crankcase ventilation (PCV) line of an engine system (such as the engine system of FIG. 1) through an aspirator to generate vacuum. Based on a direction of flow in the PCV line between an engine intake manifold and a crankcase, and further based on the configuration of the aspirators (such as the aspirators of FIGS. 2-3), the flow may be directed through a selected aspirator. An engine controller may be configured to perform control routines, such as those of FIGS. 4-6, to direct flow through the selected aspirator(s) and store the generated vacuum in a vacuum reservoir for subsequent use. In this way, vacuum may be generated irrespective of the direction of flow (of air or crankcase gases) in the PCV line. Additionally, vacuum generation may be enabled for a wider range of engine operating conditions.

Figure 1:
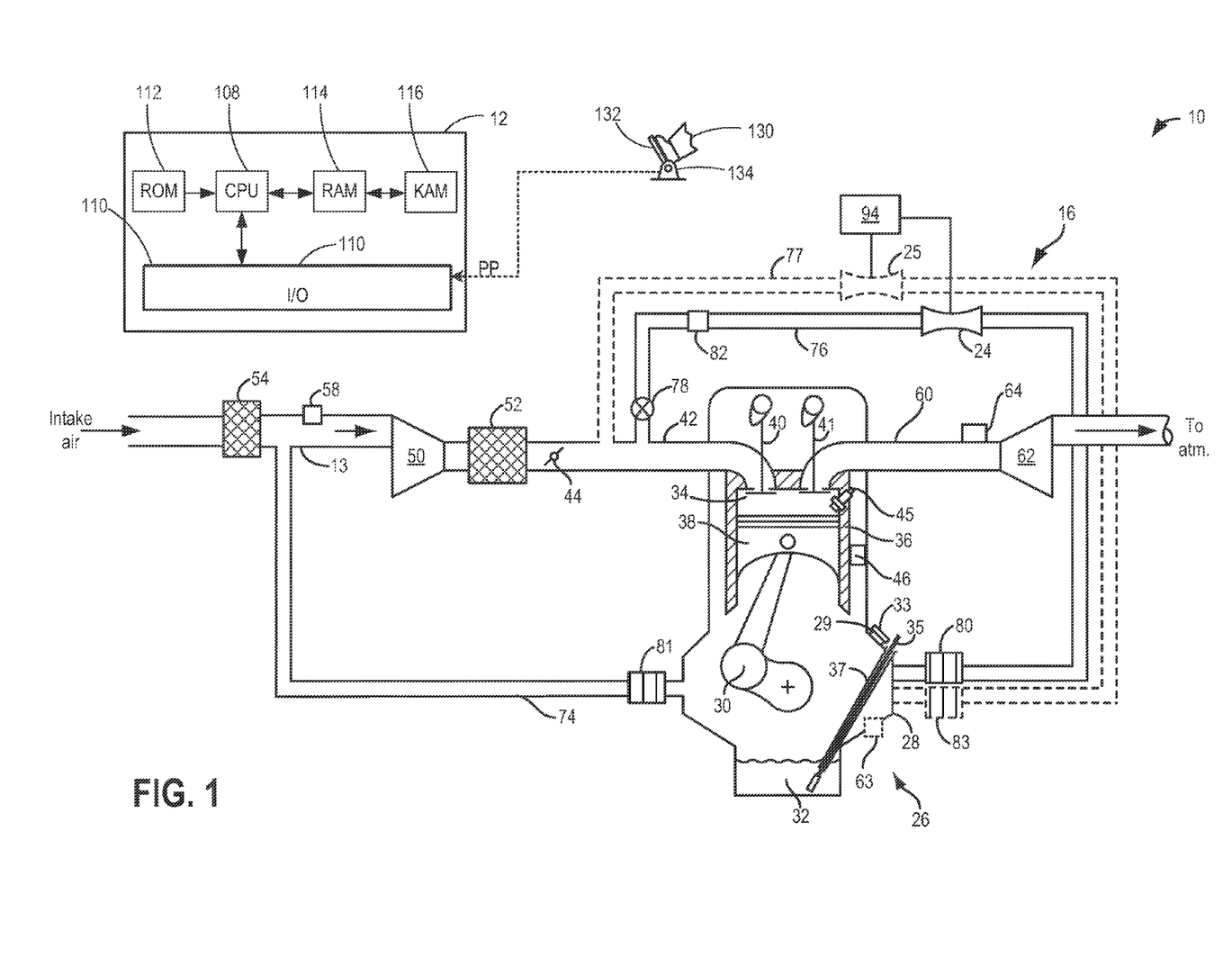
FIG. 1 shows an engine system including one or more venturis, aspirators, and/or ejectors coupled to a positive crankcase ventilation system.

Referring now to FIG. 1, it shows an example system configuration of a multi-cylinder engine, generally depicted at 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1 a positive crankcase ventilation system (PCV) 16 is coupled to the engine intake so that gasses in the crankcase may be vented in a controlled manner from the crankcase. During non-boosted conditions (when manifold pressure (MAP) is less than barometric pressure (BP)), the crankcase ventilation system 16 draws air into crankcase 28 via a breather or vent tube 74. Crankcase ventilation tube 74 may be coupled to fresh air intake passage 13 upstream of compressor 50. In some examples, breather tube may be coupled downstream of air cleaner 54 (as shown). In other examples, crankcase ventilation tube may be coupled to intake passage 13 upstream of air cleaner 54.

The crankcase ventilation system 16 also vents gases out of the crankcase and into intake manifold 42 via conduit 76 (herein also referred to as PCV line 76) which, in some examples, may include a one-way PCV valve 78 (that is, a passive valve that tends to seal when flow is in the opposite direction) to provide continual evacuation of crankcase gases from inside the crankcase 28 before connecting to the intake manifold 42. However, in other examples conduit 76 may not include a one-way PCV valve. In still other examples, the PCV valve may be an electronically controlled valve that is controlled by controller 12. As elaborated below, in some embodiments, crankcase ventilation system 16 may include a plurality of parallel conduits coupled between crankcase 28 and intake manifold 42 for directing positive crankcase ventilation vapors and gases between the crankcase and the intake manifold. For example, as shown at FIG. 1, parallel PCV conduits 76 and 77 may be provided.

The crankcase gases may include blow-by of combustion gases from the combustion chamber to the crankcase. The composition of the gases flowing through the conduit (that is, how much of the air is fresh intake air and how much of the air is non-fresh crankcase gases) affects the determination of when to run one or more aspirators coupled to the conduit (as elaborated below) since the pressure in the crank (which is largely a function of engine operation speed and load) affects the likely direction of flow between the crankcase and the intake manifold.

PCV line 76 may include a uni-directional oil separator 80 which filters oil from vapors exiting crankcase 28 before they re-enter the intake manifold 42. Another oil separator 81 may be disposed in conduit 74 to remove oil from the stream of gasses exiting the crankcases during boosted operation. In some examples, PCV line 76 may also include a vacuum sensor 82 coupled to the PCV system. As such, the gases in the crankcase consist of un-burned fuel, un-combusted air, and fully or partially combusted gasses. Further, lubricant mist is also present. The various oil separators 80, 81 are intended to reduce exiting of the oil mist from the crankcase through the crankcase ventilation system.

Based on engine operating conditions gas flow in conduits 76 and 77 may go in both directions, from crankcase 28 towards intake manifold 42 and/or from intake manifold 42 towards crankcase 28. Likewise, gas may flow through breather tube 74 in both directions, from crankcase 28 towards intake passage 13 and/or from intake passage 13 towards crankcase 28. For example, during non-boosted conditions where MAP is lower than BP, crankcase gases may flow through conduit 76 from crankcase 28 to intake manifold 42, while air flows through breather tube 74 from intake passage 13 to crankcase 28. In comparison, during boosted engine operation (when MAP is higher than BP), air may flow through conduit 76 from intake manifold 42 to crankcase 28, and crankcase vapors may flow through breather tube 74 from crankcase 28 to intake passage 13. However, in embodiments where conduit 76 includes a controllable PCV valve, the valve may only allow flow in one direction (that is, of crankcase gases from the crankcase 28 to the intake manifold 42) and disallow flow in the opposite direction (that is, of air from the intake manifold 42 to the crankcase 28).

In some embodiments, crankcase ventilation system 16 may include a plurality of parallel conduits coupled between crankcase 28 and intake manifold 42 for directing positive crankcase ventilation vapors and gases between the crankcase and the intake manifold. For example, conduit 76 of crankcase ventilation system 16 may be a first conduit 76, and the crankcase ventilation system may further include a second conduit 77 (dashed lines) arranged parallel to first conduit 76. Second conduit 77 may include an oil separator 83 for separating oil from crankcase vapors as they exit the crankcase and before they enter the intake manifold. In some embodiments, second conduit 77 may also include a dedicated vacuum sensor (not shown). In one example, as depicted, first conduit 76 includes the PCV valve 78 while second, parallel conduit 77 does not include any PCV valve. As a result of this configuration, bi-directional flow of crankcase gases and/or air between the crankcase 28 and the intake manifold 42 may be enabled through second conduit 77 while only a uni-directional flow of crankcase gases (from the crankcase 28 to the intake manifold 42) may be enabled through first conduit 76.

Crankcase ventilation system 16 may further include one or more vacuum-generating devices, such as one or more aspirators, ejectors, and/or venturis, for harnessing the flow of crankcase ventilation vapors and using it to generate vacuum. For example, crankcase ventilation system 16 may include a venturi 24 in conduit 76. The one or more venturis may include uni-directional venturis and bi-directional venturis. As such, bi-directional venturis may enable bi-directional flow of gas and vapors through the venturi and consequently are able to generate vacuum during both directions of flow across the venturi. In comparison, uni-directional venturis may enable flow of gas and vapors through the venturi in only a selected direction and consequently are able to generate vacuum during only the specific direction of flow across the venturi. Example venturi configurations and embodiments of venturi 24 are shown in further detail at FIGS. 2-3.

In embodiments where a series of parallel conduits (such as first conduit 76 and second conduit 77) are coupled between the crankcase and the intake manifold, each conduit may include a dedicated venturi. For example, as depicted here and elaborated at FIG. 2, first conduit 76 may including a first uni-directional aspirator or venturi 24 which enables vacuum to be generated at the venturi during a first direction of flow through the conduit 76, while second parallel conduit 77 includes a second bi-directional aspirator or venturi 25 which enables vacuum to be generated at the venturi during both directions of flow through the conduit 77. Each of the venturis 24, 25 may be coupled to a vacuum reservoir 94 for storing the vacuum generated by harnessing a flow through the venturi. In one example, the vacuum reservoir 94 is a hydraulic brake booster used by a vehicle brake system to assist in braking.

In some embodiments, the uni-directional aspirator coupled in conduit 76 may be adjustable to allow variable flow there-through. For example, as elaborated with reference to FIG. 3, the variable venturi may be a variable throat venturi wherein a throat area of the venturi can be adjusted to adjust a flow through the venturi, and consequently a rate of vacuum generation at the venturi. In alternate embodiments, the venturi may have an alternate aspect that is adjustable to vary the flow rate and vacuum generation rate.

Figure 4:
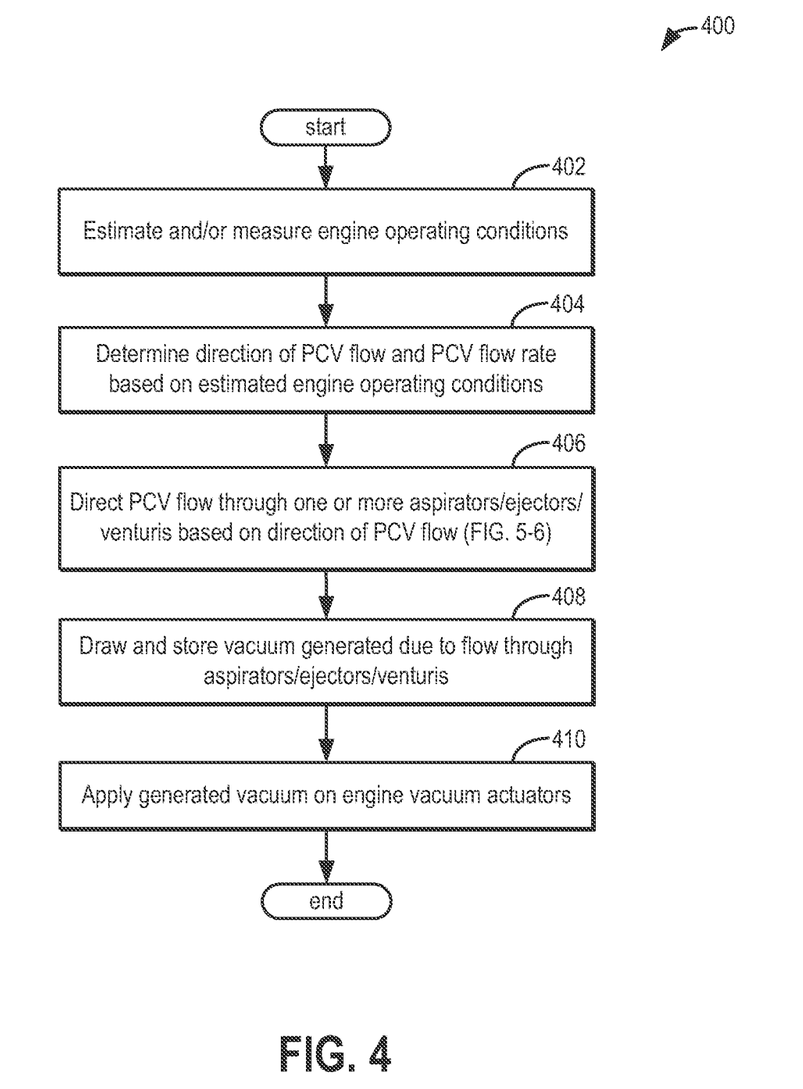
FIG. 4 shows a high level flow chart for flowing positive crankcase ventilation vapors through the one or more venturis of a positive crankcase ventilation system to generate vacuum.
Figure 5:
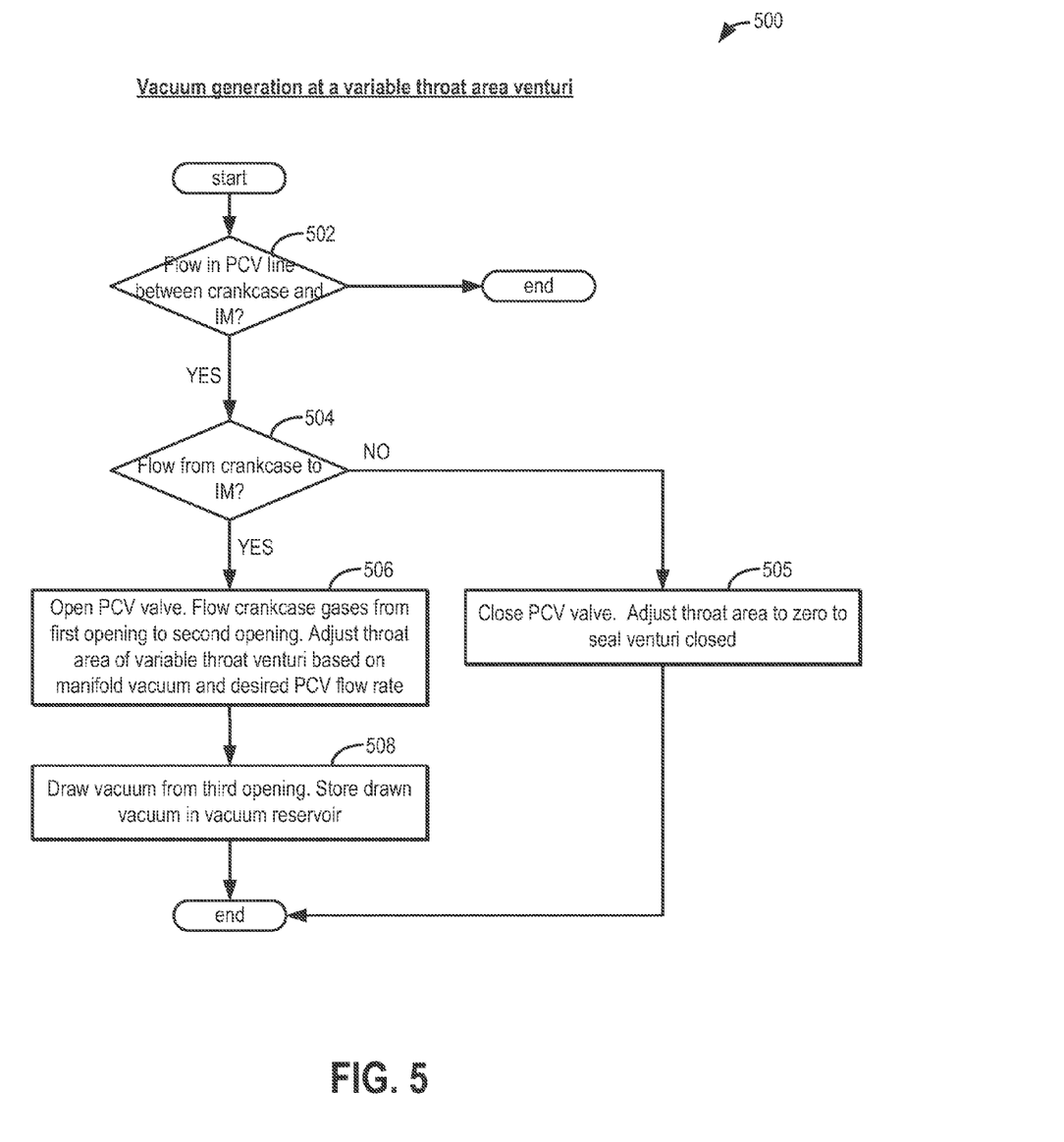
FIG. 5 shows an example method for generating vacuum while flowing positive crankcase ventilation vapors through the variable venturi of FIG. 3.

As elaborated herein with reference to FIGS. 4-5, based on a direction of flow through the PCV line (that is, through conduits 76 and 77), and further based on the configuration of the one or more variable venturis 24 in conduits 76 and 77, vacuum may be generated at the venturi and stored in the vacuum reservoir 94. The stored vacuum may then be used for actuating various engine vacuum actuators. These may include, for example, vehicle brake boosters, fuel vapor purge control systems, etc. (not shown). In alternate embodiments the vacuum generated at the venturi may be directly applied to the vacuum actuator.

It will be appreciated that, as used herein, PCV flow refers to the flow of gases through the PCV line. This flow of gases may include a flow of intake air only, a flow of crankcase gases only, and/or a flow of a mixture of air and crankcase gases, the composition of the flow based at least on the direction of the flow as well as MAP conditions relative to BP at the time of flow.

As an example, while the engine is running under light load and moderate throttle opening, the intake manifold's air pressure may be less than crankcase air pressure. The lower pressure of the intake manifold draws fresh air towards it, pulling air from the intake passage 13 via crankcase vent tube 74, then through the crankcase (where it dilutes and mixes with combustion gases), through the PCV valve 78 and variable venturi 24 in conduit 76, and into the intake manifold 42. As another example, when the engine is running boosted at high loads and larger throttle opening, the intake manifold's air pressure may be more than crankcase air pressure. The higher pressure of the intake manifold pushes fresh air towards conduit 76 and through variable venturi 24, then through the crankcase (where it dilutes and mixes with combustion gases) and conduit 74 into intake passage 12.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; etc. Furthermore, controller 12 may monitor and adjust the position of various actuators based on input received from the various sensors. These actuators may include, for example, throttle 44, intake and exhaust valve systems 40, 41, PCV valve 78, and actuable venturis (as elaborated at FIGS. 2-3). Storage medium read-only memory 112 can be programmed with computer readable data representing instructions executable by processor 108 for performing the methods described below, as well as other variants that are anticipated but not specifically listed. Example methods and routines as described herein with reference to FIGS. 4-6.

In this way, the system of FIG. 1 enables a method of vacuum generation in an engine. Specifically, by flowing air and/or crankcase gases, in both directions, between an intake manifold and a crankcase via a variable venturi, vacuum is generated at the venturi and stored in a vacuum reservoir. The stored vacuum can then be applied at a later time to one or more engine vacuum actuators. By enabling vacuum to be generated irrespective of the direction of PCV flow, vacuum is generated at a wider PCV flow window. In addition, vacuum can be generated while reducing the effect of the vacuum generation on the minimum controllable airflow budget and air-fuel ratio budget of the engine. This enables minimum perturbation to a stable air-fuel ratio control which improves driveability and exhaust emissions.

Figure 2:
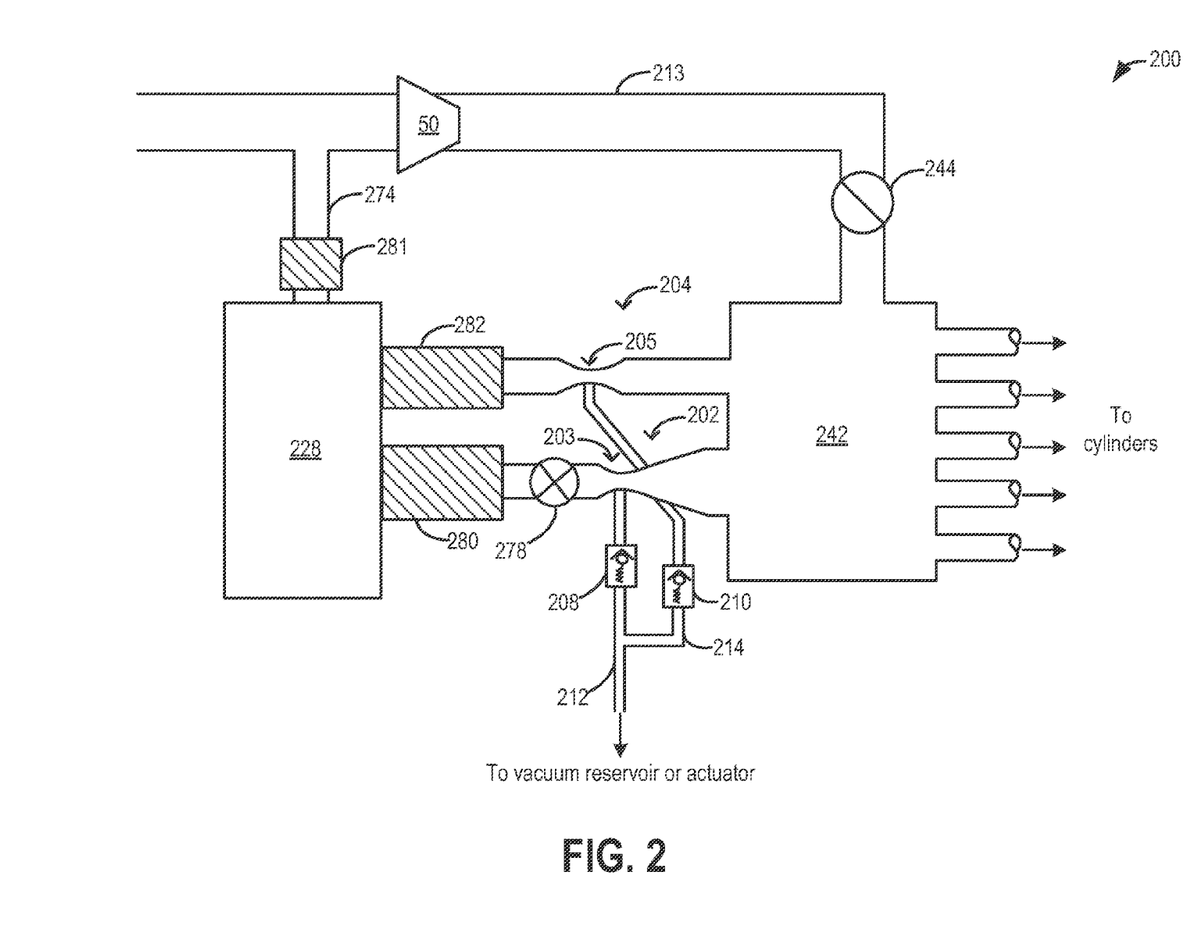
FIGS. 2-3 show example embodiments of the one or more venturis, aspirators, and/or and ejectors of FIG. 1.

FIG. 2 shows a first embodiment 200 of a PCV system (such as PCV system 16 of FIG. 1) including a plurality of aspirators that may be used as venturi 24 (and venturi 25) of FIG. 1. In the depicted embodiment, the PCV system includes each of a first conduit (or first PCV line) 202 and a second, parallel conduit (or second PCV line) 204 coupled between crankcase 228 and intake manifold 242. The first conduit 202 includes a first aspirator 203 while second conduit 204 includes a second aspirator 205. The first aspirator may be a first uni-directional aspirator coupled to a one-way PCV valve 278. First aspirator 203 may have a throat diameter that is 2.0 to 5.0 mm in diameter. PCV valve may enable uni-directional flow through first conduit 202 and first aspirator 203. Specifically, PCV valve 278 may enable flow of crankcase gases and vapors from the crankcase to the intake manifold through first conduit 202 and first aspirator 203, such as during engine idling conditions, but may disable flow of air from the intake manifold to the crankcase through first conduit 202 and first aspirator 203, such as during boosted engine conditions. In comparison, second aspirator 205 in second conduit 204 is a bi-directional aspirator. Second aspirator 205 may have a throat diameter that is 1.5 to 2.0 mm in diameter. Thus, flow may be enabled through the second aspirator during flow of crankcase gases from the crankcase and the intake manifold, as well as during flow of intake air from the intake manifold to the crankcase.

As such, conventional PCV valves may be largely mechanical and may vary an effective area based on flow or pressure. Such valves may also be controlled by a controller (e.g., controlled by a powertrain control module (PCM) of the controller or PCM controlled). Herein, by directing the flow energy to a venturi instead of expending it across an orifice, the flow energy may be harnessed for vacuum generation. In particular, instead of losing the flow energy across the PCV line to heat, flow control is accomplished while harvesting the flow energy for vacuum generation. By either opening the PCV valve the whole way or using a variable venturi, the need for throttling of the flow that is in-line with the venturi is obviated.

During a first condition, such as at idle engine conditions when manifold vacuum is lower than a threshold pressure (e.g., below 30 kPa) and while MAP is less than barometric pressure (BP), crankcase gases may flow in a first direction from the crankcase 228 to the intake manifold 242. Specifically, air may be drawn from upstream of compressor 50 along crankcase vent tube 274 into crankcase 228. From there the crankcase vapors may flow through each of first conduit 202 (via first aspirator 203) and second conduit 204 (via second aspirator 205) into intake manifold 242. In addition, during engine idling conditions, PCV valve 278 may be actuated open by an engine controller to enable flow of at least some crankcase vapors from the crankcase to the intake manifold via the first conduit. As the crankcase gases and vapors flow through the first conduit 202, vacuum is generated at first aspirator 203, and drawn into a vacuum actuator along first vacuum passage 212. In some embodiments, a check valve 208 may be included in first vacuum passage 212 for ensuring correct direction of flow.

A remaining portion of the crankcase gases may flow through second conduit 204. As the crankcase gases flow through the second conduit 204, vacuum is also generated at second aspirator 205, and drawn into a vacuum actuator along second vacuum passage 214. In some embodiments, a check valve 210 may be included in second vacuum passage 214 for ensuring correct direction of flow. As such, due to the difference in orifice sizes between the first and second aspirator, during the first direction of crankcase ventilation flow from the crankcase to the intake manifold, a first, larger portion of crankcase gases may be directed through first conduit 202 while a second smaller, remaining portion of the crankcase gases may be directed through second conduit 204. As a result, first aspirator 203 may dominate vacuum generation at engine idle conditions (over second aspirator 205). However, in alternate embodiments, a first portion of crankcase gases may be directed through the first conduit while a second, remaining portion of crankcase gases are directed through the second conduit wherein based on operating conditions, the first portion may be smaller than the second portion or substantially similar to the second portion.

In one example, the conduit coupled to aspirator 205 may be open all time. Herein, when MAP is greater than BP, fresh air is being blown into the crankcase. This fresh air functions as the purging or flushing gas. Then, when MAP is less than BP, aspirator 205 draws crankcase gases into the intake manifold for combustion (or disposal). At this low vacuum condition, PCV valve 278 may be opened to provide vacuum enhancement.

In some embodiments, a position (e.g., an opening) of PCV valve 278 may be adjusted during the flowing to adjust a flow rate of crankcase gases through the first aspirator. Specifically, the flow rate of crankcase gases from the crankcase to the intake manifold may be adjusted to maintain an idle air flow rate in the intake manifold. As such, this may also enable a desired vacuum generation rate to be provided at the aspirator. In addition, a flow rate through oil separator 280 coupled to first conduit 202 may be maintained at a desired rate. Likewise, a flow rate through oil separator 281 coupled to crankcase vent tube 274 may also be maintained at a desired rate. By reducing flow rate fluctuations at oil separators coupled upstream and downstream of the crankcase, and maintaining substantially constant flow rates through the oil separators, an oil separation efficiency can be substantially improved (e.g., at or above 99% efficiency).

During non-idle engine conditions, such as when the engine is spinning with an engine speed above a threshold speed, and while MAP is above a threshold and higher than BP, crankcase gases may flow is a second, opposite direction from the intake manifold 242 to the crankcase 228. As another example, during boosted engine conditions, while the estimated MAP is higher than BP, air may flow in the second direction from the intake manifold to the crankcase. That is, the second direction of flow is opposite to the first direction of flow.

Figure 6:
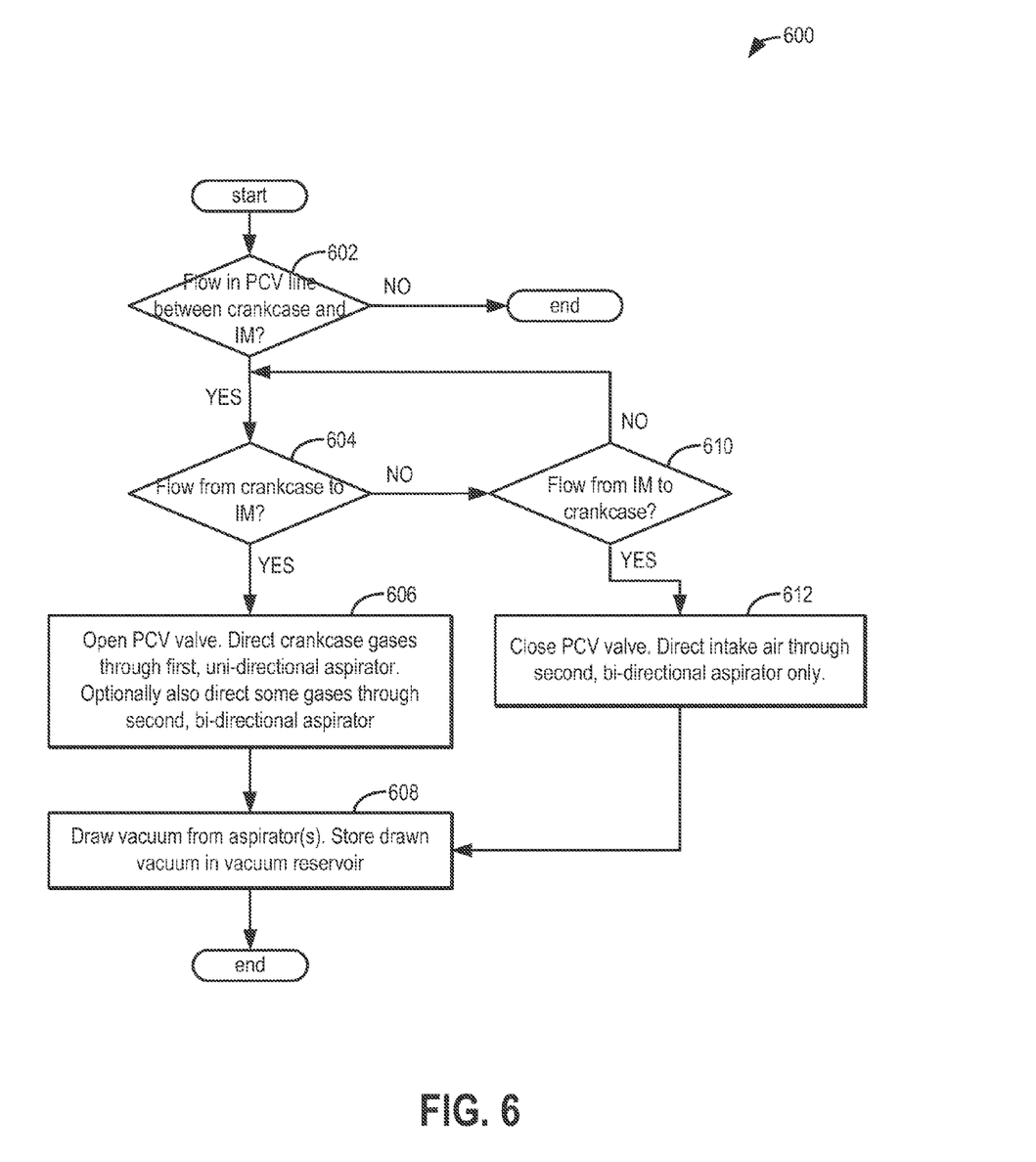
FIG. 6 shows an example method for generating vacuum while selectively flowing positive crankcase ventilation vapors through at least one of the multiple aspirators of FIG. 2.

During the flowing of air and/or gases through second conduit 204 and second aspirator 205, a flow rate through oil separator 282 coupled to second conduit 204 may be maintained at a desired rate. By reducing flow rate fluctuations at the oil separator and maintaining a substantially constant flow rate through the oil separator, the oil separation can be substantially improved. FIG. 6 shows one embodiment of an overall control routine for adjusting flow of crankcase gases and air through the first and/or second aspirator based at least on a direction of flow between the engine intake manifold and the crankcase to thereby maximize vacuum generation.

Figure 3:
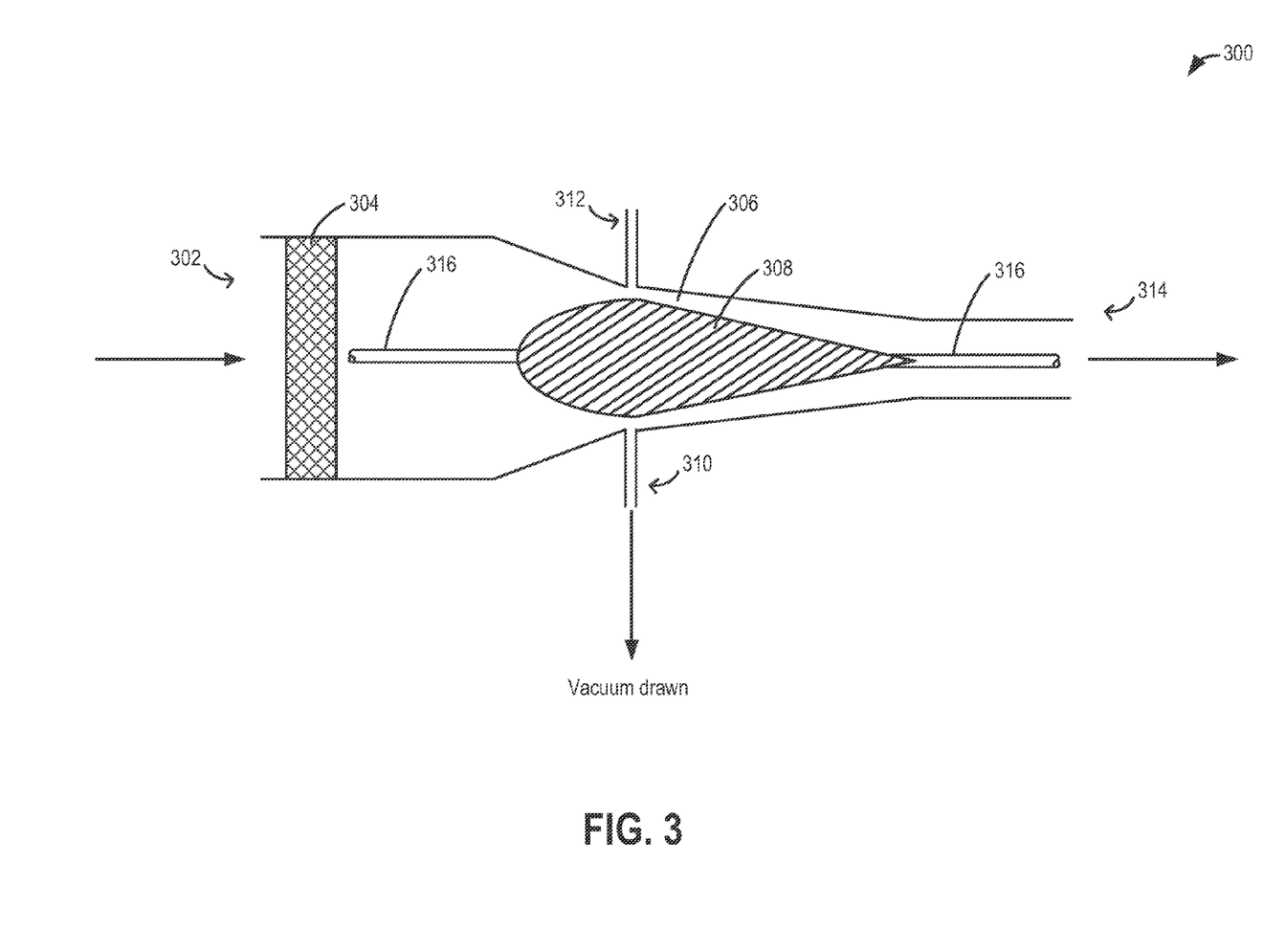

FIG. 3 shows an embodiment of a variable throat area venturi 300 that may be used as a uni-directional venturi in the engine system of FIG. 1. In particular, venturi 300 may be used as venturi 24 in PCV line 76 of FIG. 1. Gases (e.g., crankcase gases) can enter the variable venturi 300 via first opening 302. First opening 302 constitutes a flow inlet or airflow passage of the venturi with the largest cross-sectional area. Gases subsequently pass through filter 304 before entering the variable venturi throat 306. Variable venturi 300 further includes an adjustable sliding "egg" 308. By adjusting a position of sliding "egg" 308 within variable venturi throat 306, a cross-sectional area of the variable venturi throat can be adjusted. For example, during a first direction of flow from first opening 302 towards a second opening 314, sliding "egg"

308 may be moved towards first opening 302 to increase the throat area of the variable venturi. As a result, an increased motive flow rate (or critical flow rate) is achieved which leads to an increase in vacuum generated by the venturi effect. This enables first opening 302 to draw a larger amount of positive crankcase ventilation vapors and gases during crankcase gas flow from the intake manifold to the crankcase through conduit 76 of FIG. 1.

In the depicted example, an outer (external) surface of the sliding "egg" 308 is contoured like a raindrop, or airplane wing, so as to provide a linear change in flow rate which is proportional to the longitudinal position of the sliding "egg" 308 relative to the narrowest restriction, or throat 306, of the variable venturi. Specifically, the contours are designed such that the minimum area remains at the vacuum zone (that is, a zone from where vacuum is drawn). A trailing edge of the sliding "egg" is designed to ensure pressure recovery, and thereby improve venturi efficiency. Specifically, the gradually increasing flow area allows the kinetic energy of the flow through the venturi to be converted into pressure energy. In this way, a continuous variable range of critical flow rates through the throat 306 is enabled. It will be appreciated that in alternate embodiments, the exterior surface of the sliding "egg" may be contoured so as provide a constant critical flow rate as the longitudinal position of the sliding "egg" is adjusted in throat 306. Further still, the sliding "egg" may be designed so as to vary the effective cross sectional area in discrete increments, rather than in a continuous manner as depicted.

A position of the sliding egg may be varied in response to changing fluid conditions such as pressure, temperature and composition of an inflowing gas entering the variable venturi. For example, the sliding "egg" may be supported by concentric rods 316 arranged along a longitudinal axis of the "egg". By varying a position of the concentric rods, a position of the egg 308 in throat 306 can be changed. In alternate embodiments, the sliding "egg" may be supported with fins on the inner diameter of a central supporting tube. A spring may be optionally added to make the position responsive to flow or pressure.

Variable venturi 300 further includes a second opening 314 that constitutes a flow outlet of the venturi. Thus, during flow of crankcase gases in a first direction through a PCV line, specifically from the crankcase to the intake manifold, crankcase ventilation vapors and gases may flow from the first opening to the second opening, as depicted here by solid arrows. That is, the vapors may enter the variable venturi at first opening 302 and exit at second opening 314. From second opening 314, the vapors then enter the intake manifold downstream of the intake throttle, before entering the combustion chamber. As the crankcase gases accelerate through the narrow venturi and lose their pressure, vacuum is generated. The generated vacuum is then drawn from third opening 310 and may be stored in a vacuum reservoir. For example, the vacuum may be stored at a hydraulic brake booster.

In some embodiments of variable venturi 300, the venturi may further include a fourth opening 312 also configured to draw the vacuum generated at venturi throat 306 into the vacuum reservoir. Thus, when included, as crankcase gases flow from the crankcase to the intake manifold, vacuum is generated at the throat and drawn from third opening 310 and/or fourth opening 312 into the vacuum reservoir.

Egg 308 can be slid all the way to the right to seal the venturi closed. This allows the variable venturi to have uni-directional flow only. For example, during flow of intake air in a second direction through the PCV line, specifically from the intake manifold to the crankcase, the egg may be moved towards outlet 314 (in the depicted example, towards the right) to seal the venturi and disable flow there-through under those conditions.

During each mode, the movement of the sliding "egg" of the venturi increases or decreases pressure (vacuum) generated at the venturi by varying the flow rate through the PCV system. In other words, adjustment of the throat area of the venturi may affect the flow rate through the PCV system coupled with it, allowing higher or lower vacuums to be generated as the variable venturi is adjusted. As such, the variable venturi needs a larger throat area during low manifold vacuum conditions and a smaller throat area during high manifold vacuum conditions. The venturi needs zero throat area during negative manifold vacuum, that is during boosted conditions.

For example, during a first mode of venturi operation, the sliding "egg" may be moved towards first opening 302 to open the venturi and increase the throat area and the resultant vacuum generation rate. In comparison, during a second mode of venturi operation, the sliding "egg" may be moved towards second opening 314 to close and decrease the throat area and the resultant vacuum generation rate. FIG. 5 shows one embodiment of an overall control routine for adjusting the throat area of a variable throat area venturi based at least on a direction and rate of flow in a PCV line between the engine intake manifold and the crankcase to thereby maximize vacuum generation at the venturi.

Now turning to FIG. 4, an example method 400 is shown for flowing gasses, in both directions, between an intake manifold and a crankcase via a variable venturi to generate vacuum at the venturi. In this way, vacuum may be generated by harnessing PCV flow in either direction in a PCV line.

At 402, engine operating conditions may be estimated and/or measured. These may include, for example, engine speed, torque demand, boost level, manifold pressure (MAP), manifold air flow (MAF), engine temperature, ambient temperature and pressure conditions, barometric pressure (BP), etc. At 404, based on the estimated engine operating conditions, a direction of positive crankcase ventilation (PCV) flow may be determined. Specifically, it may be determined whether crankcase gases are flowing in the PCV line from the crankcase to the intake manifold, or whether air is flowing in the PCV line from the intake manifold to the crankcase. In one example, during a first condition, such as at idle engine conditions when manifold vacuum is lower than a threshold pressure (e.g., below 30 kPa) and while the estimated MAP is less than barometric pressure (BP), crankcase gases may flow is a first direction from the crankcase to the intake manifold. In another example, during a second condition, such as during boosted engine conditions when manifold vacuum is higher than a threshold pressure (e.g., above 30 kPa) and while the estimated MAP is higher than BP, fresh air may flow in a second direction from the intake manifold to the crankcase, the second direction being opposite to the first direction. In addition to the direction of flow through the PCV line, a flow rate of gasses flowing between the intake manifold and the crankcase may also be determined based on the estimated engine operating conditions.

At 406, the routine includes directing the gasses through one or more venturis/aspirators/ejectors of the engine based on the direction of flow in the PCV line. The aspirators/variable venturis may be positioned in one or more conduits between the crankcase and the intake manifold. For example, as elaborated with reference to FIG. 2, the PCV line may include a first conduit having a first, uni-directional variable venturi and a second conduit having a second bi-directional variable venturi, the second conduit parallel to the first conduit. As elaborated herein at FIGS. 5-6, directing the gasses through the PCV line may include selectively flowing gasses through a specific aspirator if multiple aspirators are available. Alternatively, when there is a single aspirator, such as a variable venturi, directing the gasses may include adjusting a parameter of the variable venturi (e.g., adjusting a throat area of a variable throat venturi) to thereby adjust a flow rate through the venturi. A flow rate of crankcase gases flowing through the venturi may be adjusted based on one or more engine operating conditions, including manifold pressure, boost pressure, and barometric pressure. The flow rate through the venturi may also be adjusted based on engine speed. As such, by adjusting a flow rate through the venturi/aspirators, a rate of vacuum generation as well as an engine air flow rate may be adjusted. Thus, by adjusting a flow rate of gasses flowing through the venturi/aspirators in the PCV line, a desired PCV flow rate (and therefore a desired vacuum generation rate) may be achieved without affecting the air flow budget of the engine, in particular at idle engine speeds. Likewise, the desired PCV flow rate is achieved without affecting the engine's exhaust air-fuel ratio.

In one example, where the engine further includes one or more oil separators coupled upstream and/or downstream of the crankcase, the adjusted PCV flow rate may also affect a flow rate of the PCV gases through the oil separator(s). Thus, during the flowing of PCV gas through the variable venturis, a flow rate of PCV gas may be adjusted such that a flow of the PCV gases through the oil separator is also maintained at a desired flow rate. For example, the flow rate through the crankcase oil separator may be maintained substantially constant. In this way, by allowing the PCV flow rate through the oil separator to be maintained, oil separation efficiency is improved.

Next, at 408, the method includes drawing a vacuum at the venturi due to the flow of gasses through the venturi/aspirators. That is, the PCV flow through the venturi may be harnessed and used to generate vacuum. Additionally, the vacuum drawn from the venturi may be stored, for example, in a vacuum reservoir. At 410, the drawn and stored vacuum may be applied on one or more engine vacuum actuators to enable them to be operated. In one example, the vacuum reservoir may be coupled to a hydraulic brake booster, wherein the vacuum stored in the vacuum reservoir is used to apply vehicle brakes. However, in an alternate embodiment, the hydraulic brake booster may be directly coupled to the venturi. Herein, the hydraulic booster may act as a vacuum reservoir for storing vacuum during some conditions (e.g., when vacuum is not required to operate the vehicle brakes) and may act as a vacuum actuator during other conditions (e.g., when vacuum is required to operate the vehicle brakes).

In this way, positive crankcase ventilation vapors can be flowed in both directions, between an intake manifold and a crankcase, via a variable venturi to generate vacuum at the venturi. By drawing a vacuum from the venturi during either direction of flow through the venturi, vacuum generation efficiency is improved while also reducing engine air flow fluctuations.

Now turning to FIG. 5, an example method 500 is shown for adjusting the throat area of a variable throat venturi during flow of gasses through a PCV line to draw vacuum at the venturi.

At 502, it may be determined if there is any flow of gasses (crankcase gases or air) between the crankcase and the intake manifold. Specifically, it may be determined if there is a flow, irrespective of a direction of the flow. In one example, a PCV flow may be determined based on the output of a flow sensor coupled to the PCV system. Alternatively, a PCV flow may be inferred from engine operating conditions, such as based on MAP relative to BP.

If a flow is confirmed, then at 504, it may be determined if there is a flow of crankcase gasses from the crankcase to the intake manifold. In one example, there may be a flow of crankcase gasses from the crankcase to the intake manifold during (positive) manifold vacuum conditions, that is when there is no boost. As another example, during idle engine conditions, such as when the engine is spinning but an engine speed is below a threshold speed, and while MAP is above a threshold but lower than BP, crankcase gases may flow in a first direction from the crankcase to the intake manifold. As still another example, during idle engine conditions, when manifold vacuum is lower than a threshold pressure (e.g., below 30 kPa) and while the estimated MAP is less than barometric pressure (BP), crankcase gases may flow in the first direction from the crankcase to the intake manifold. Upon confirmation of flow from the crankcase to the intake manifold, at 506, the routine includes opening the PCV valve in the PCV line to enable flow of crankcase gasses through the variable venturi, specifically, from a first opening of the variable venturi to a second opening of the venturi, and vacuum generation at the venturi. Additionally, a flow rate through the variable venturi may be adjusted to maintain a desired PCV flow rate and/or a desired rate of vacuum generation at the venturi.

In one example, where the variable venturi is a variable throat venturi, the adjusting may include varying a throat area of the variable throat area venturi. For example, to increase a flow rate through the venturi, a sliding egg in the throat of the venturi may be moved towards an opening of the venturi though which the flow enters. As an example, during lower manifold vacuum conditions, the throat area of the variable venturi is increased by moving the sliding egg towards the first opening or inlet of the venturi. As another example, during higher manifold vacuum conditions, the throat area of the variable venturi is decreased (but not closed) by moving the sliding egg towards the second opening or outlet of the venturi.

Next, at 508, the routine includes, while flowing crankcases gases from the first opening to the second opening of the venturi, drawing a vacuum generated at the venturi from the third opening (and the fourth opening) of the variable venturi. The drawn vacuum may then be stored in a vacuum reservoir and/or applied to one or more vacuum actuators, as needed.

Returning to 504, if there is no flow of crankcase gases from the crankcase to the intake manifold, it may be determined that there is a flow of air from the intake manifold to the crankcase. For example, during non-idle engine conditions, such as when the engine is spinning with an engine speed above a threshold speed, and while MAP is above a threshold and higher than BP, air may flow in a second direction from the intake manifold to the crankcase. Upon confirmation, at 505, the routine includes closing the PCV valve in the PCV line to disable flow of air through the variable venturi. As such, during this condition, no vacuum is generated at the venturi. Additionally, a throat area of the variable venturi is adjusted to seal the venturi closed. For example, the throat area of the variable venturi is decreased to zero throat area by shifting the sliding egg to the second opening or outlet of the venturi, thereby sealing the venturi closed.

In one example, the variable venturi may be operated in a first mode when there is flow of crankcase gases in the first direction from the crankcase to the intake manifold. Then, when there is flow of air in the second, opposite direction from the intake manifold to the crankcase, the variable venturi may be operated in a second mode. During the first mode, flow may be directed from the first opening to the second opening of the venturi while vacuum is drawn through the third opening. At the same time, a position of the sliding egg is adjusted to increase the throat area during low manifold vacuum conditions while decreasing the throat area during higher manifold vacuum conditions. In comparison, during the second mode, no flow may be directed through the venturi and no vacuum may be generated at the variable venturi. During this mode, a position of the sliding egg may be adjusted to provide zero throat area and seal the venturi closed.

In this way, by using a uni-directional venturi having a variable throat area that is coupled to a PCV valve in a PCV line, directing of only crankcase gasses to a motive flow inlet of a venturi coupled in an engine intake system is enabled to generate vacuum at the venturi. By opening the valve to enable flow through the venturi during selected engine operating conditions (such as when intake manifold pressure is smaller than barometric pressure) and closing the valve to disable flow through the venturi during other engine operating conditions (such as when intake manifold pressure is larger than barometric pressure), the flow of crankcase gasses in the PCV line can be harnessed to generate vacuum while maintaining an air flow rate budget.

Now turning to FIG. 6, an example method 600 is shown for adjusting the directing of a PCV flow (including air and PCV gases) through one or more aspirators of a positive crankcase ventilation system coupled to the engine. Specifically, the method enables flow through at least one of a plurality of aspirators coupled in a PCV line between the crankcase and intake manifold, such as the plurality of aspirators of FIG. 2, to be adjusted to draw vacuum during both directions of flow through the PCV line.

At 602, as at 502, it may be determined if there is any flow of crankcase gases and/or air in the PCV line between the crankcase and the intake manifold. Specifically, it may be determined if there is a flow, irrespective of a direction of the flow. In one example, a PCV flow may be determined based on the output of a flow sensor coupled to the PCV system. Alternatively, a PCV flow may be inferred from engine operating conditions, such as MAP relative to BP.

If a flow is confirmed, then at 604, it may be determined if there is a flow of crankcase gases from the crankcase to the intake manifold. In one example, during idle engine conditions, such as when manifold vacuum is lower than a threshold pressure (e.g., below 30 kPa) and while the estimated MAP is less than barometric pressure (BP), PCV gases may flow in a first direction from the crankcase to the intake manifold. As another example, during idle engine conditions, such as when the engine is spinning but an engine speed is below a threshold speed, and while MAP is above a threshold but lower than BP, PCV gases may flow in the first direction from the crankcase to the intake manifold.

Upon confirmation that there is a PCV flow from the crankcase to the intake manifold, at 606, the routine includes, during the first direction of crankcase ventilation flow, directing crankcase gases through a first aspirator coupled between the crankcase and the intake manifold. As such, the first aspirator may be a first uni-directional aspirator coupled to a PCV valve, the first aspirator and the PCV valve positioned in a first conduit coupled between the crankcase and the intake manifold. In particular, the engine controller may open the PCV valve to enable flow through the first aspirator. Upon opening the PCV valve, at least some of the PCV gas can be directed through the first aspirator.

The PCV system may further include a second conduit coupled between the crankcase and the intake manifold, the second conduit parallel to the first conduit. A second, bi-directional aspirator may be positioned in the second conduit. Due to the bi-directional nature of the second conduit, at 606, the routine may optionally further include directing some PCV gas from the crankcase to the intake manifold through the second aspirator.

In some embodiments, a position (e.g., an opening) of the PCV valve coupled to the first aspirator may be adjusted during the directing of flow through the first aspirator to thereby adjust a flow rate of PCV gas through the first aspirator. Specifically, the flow rate of PCV gas may be adjusted to maintain an idle air flow rate in the intake manifold. As such, this may also enable a desired vacuum generation rate to be provided at the aspirator. In addition, where the aspirator is coupled to the crankcase via an oil separator, a flow rate through the oil separator may be maintained at a desired rate. By reducing flow rate fluctuations at the oil separator and maintaining a substantially constant flow rate through the oil separator, oil separator efficiency can be substantially improved.

At 608, the routine includes, during the directing through the first aspirator, drawing a vacuum at the first aspirator. In addition if any flow is directed through the second aspirator, vacuum may be drawn at the second aspirator. The drawn vacuum may then be stored in a vacuum reservoir and/or applied to one or more vacuum actuators, as needed.

Herein, as a result of flowing at least some PCV gas through the first aspirator in the first conduit and the second aspirator in the second conduit during engine idle conditions, engine idle air flow rate budget may be better maintained while generating a larger amount of vacuum. In addition, sufficient PCV flow may be provided to address pressure build-up in the crankcase.

In this way, crankcase gasses flowing in a first direction from the crankcase to the intake manifold can be flowed through at least a first venturi to generate vacuum at the first venturi. In addition, the crankcase gases may be flowed through a second venturi to generate vacuum at the second venturi. By flowing a first, larger portion of crankcase gases through the first venturi and flowing a second, remaining portion of the crankcase gases through the second venturi, substantially all the flow of crankcase gases can be advantageously harnessed for vacuum generation while maintaining the air flow budget.

Returning to 604, if a flow in the PCV line from the crankcase to the intake manifold is not confirmed, then at 610, it may be determined if the flow in the PCV line is from the intake manifold to the crankcase. As an example, during non-idle engine conditions, such as when the engine is spinning with an engine speed above a threshold speed, and while MAP is above a threshold and higher than BP, PCV gases and/or air may flow is a second direction from the intake manifold to the crankcase. As another example, during boosted engine conditions, when manifold vacuum is higher than a threshold pressure (e.g., above 30 kPa) and while the estimated MAP is higher than BP, air may flow in the second direction from the intake manifold to the crankcase. That is, the second direction of flow is opposite to the first direction of flow.

Upon confirming that PCV flow is from the intake manifold to the crankcase, at 612, the routine includes, during the second, opposite direction of crankcase ventilation flow, directing PCV gas and vapors through the second aspirator (but not the first aspirator) coupled between the crankcase and the intake manifold. As such, the second aspirator may be a second bi-directional aspirator positioned in a second conduit coupled between the crankcase and the intake manifold. In particular, the engine controller may close the PCV valve to disable flow through the first aspirator while only directing PCV gas and vapors through the second aspirator in the second conduit.

From here, the routine returns to 608 wherein, during the directing through the second aspirator, the routine includes drawing a vacuum at the second aspirator. The drawn vacuum may then be stored in a vacuum reservoir and/or applied to one or more vacuum actuators, as needed.

Herein, as a result of flowing air through the second aspirator in the second conduit during engine non-idle (e.g., boosted) conditions, boost air flow rate budget may be better maintained while generating a larger amount of vacuum. In addition, PCV vapor evacuation may be enabled even under boosted conditions, and without the requirement for additional lines between the intake and the crankcase.

In one example, the PCV system may be operated in a first mode during engine idle conditions with the PCV valve open to flow crankcase gases in the first direction from the crankcase to the intake manifold through the first aspirator. Specifically, the first direction of flow may include flow of only crankcase gasses from the crankcase to the intake manifold. The PCV system may be further operated in a second mode during engine non-idle conditions, such as during boosted engine operating, with the PCV valve closed to flow air in the second, opposite direction from the intake manifold to the crankcase, through the second aspirator. Specifically, the second direction of flow may include flow of at least intake air from the intake manifold to the crankcase. During both modes (and thus during both engine idle and non-idle conditions), vacuum is drawn from the first or second aspirator (as appropriate).

As another example, an engine system may include an engine intake system having an intake manifold and a crankcase, a first and a second aspirator coupled between the intake manifold and the crankcase, a valve coupled to the first aspirator, and a controller with computer readable instructions for, flowing crankcase gasses in a first direction from the crankcase to the intake manifold through the first aspirator during engine idle conditions, flowing at least intake air in a second, opposite direction from the intake manifold to the crankcase through the second aspirator during engine non-idle conditions, and during both conditions, drawing vacuum from the first or second aspirator. The controller includes further instructions for opening the valve during the engine idle conditions to enable flow through the first aspirator while closing the valve during the engine non-idle conditions to disable flow through the first aspirator. The controller may also adjust the valve to adjust a flow rate of crankcase gasses through the first aspirator during the engine idle conditions, the flow rate of crankcase gasses adjusted to maintain an idle air flow rate in the intake manifold. The engine system may further comprise a first oil separator coupled upstream of the crankcase and a second oil separator coupled downstream of the crankcase. During both the engine idle and non-idle conditions, a flow rate of crankcase gasses or intake air through the oil separators may also be maintained substantially constant.

In this way, vacuum is generated in a PCV line during both directions of flow through the PCV line. By enabling crankcase gases and/or air to be directed through at least one aspirator irrespective of the direction of flow between a crankcase and an intake manifold, PCV flow during both idle and non-idle engine conditions can be advantageously used to generate vacuum. By broadening the window for vacuum generation, vacuum generation efficiency during engine operation is improved, reducing the need for ancillary vacuum pumps. By enabling vacuum generation to be enabled at a wider range of airflow rates, the minimum controllable airflow budget of the engine is better maintained. Likewise, the impact of vacuum generation on engine air-fuel ratio control is reduced. By improving vacuum generation from PCV flow during idle engine conditions, idle air flow rate control is also improved. In addition, by maintaining a flow rate of crankcase vapors through one or more crankcase oil separators coupled upstream and downstream of the crankcase, crankcase gas oil separation efficiencies are improved.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An engine method comprising,
in a positive crankcase ventilation system comprising a first, uni-directional venturi and a second, bi-directional venturi, flowing gases in both directions between an intake manifold, downstream of an intake throttle and a crankcase via at least one of the first, uni-directional venturi and the second, bi-directional venturi; and
while flowing gases in both directions, generating vacuum at the at least one of the first and second venturi.

2. The method of claim 1, wherein flowing gases in both directions includes, during a first condition, flowing crankcase gases in a first direction from the crankcase to the intake manifold, and during a second condition, flowing intake air in a second direction from the intake manifold to the crankcase.

3. The method of claim 2, wherein the positive crankcase ventilation system includes a first conduit including the first, uni-directional variable venturi downstream of a PCV valve, and a second conduit including the second, bi-directional variable venturi coupled between the intake manifold and the crankcase, the first conduit parallel to the second conduit, and wherein during the first condition, the PCV valve is open and wherein during the second condition, the PCV valve is closed.

4. The method of claim 3, wherein flowing gases through the at least one of the first and second venturi includes, during the first condition, flowing crankcase gases in the first direction through at least the first venturi and generating vacuum at the first venturi, and during the second condition, flowing intake air in the second direction through the second venturi but not the first venturi and generating vacuum at the second venturi.

5. The method of claim 4, wherein flowing crankcase gases in the first direction through at least the first venturi includes flowing a first, larger portion of crankcase gases through the first venturi and flowing a second, remaining portion of crankcase gases through the second venturi.

6. The method of claim 5, wherein the first condition includes manifold pressure being smaller than barometric pressure, and wherein the second condition includes manifold pressure being larger than barometric pressure.

7. The method of claim 6, wherein during the first condition, vacuum generated at the first venturi is stored in a vacuum reservoir, and during the second condition, vacuum generated at the second venturi is stored in the vacuum reservoir.

8. The method of claim 7, wherein the vacuum reservoir is a hydraulic brake booster.

9. The method of claim 8, wherein each of the first and second variable venturi is coupled to the crankcase via respective oil separators, and wherein during the flowing gases in both directions, a flow rate of the gases through the respective oil separators is maintained at a desired flow rate.

10. The method of claim 9, wherein the first venturi includes a valve, and wherein during the first condition, a flow rate of crankcase gases through the first venturi is adjusted by adjusting an opening of the valve, the adjusting based on one or more of manifold pressure, boost pressure, barometric pressure, and engine speed.

11. The method of claim 9, wherein the first venturi is a variable throat area venturi, and wherein during the first condition, a flow rate of crankcase gases through the first venturi is adjusted by varying a throat area of the variable throat area venturi.

12. A method comprising,
flowing gases in both directions between an intake manifold, downstream of an intake throttle and a crankcase via a variable venturi, wherein flowing gases includes, during a first condition, flowing crankcase gases in a first direction through a first venturi while generating vacuum at the first venturi, and during a second condition, flowing intake air in a second, opposite direction through a second venturi, while generating vacuum at the second venturi.

13. A method comprising,
flowing gases in both directions between an intake manifold, downstream of an intake throttle and a crankcase via a venturi, wherein flowing gases includes, during a first condition, flowing crankcase gases in a first direction through a first variable throat venturi while generating vacuum at the first venturi and during a second condition, flowing intake air in a second, opposite direction through a second venturi while generating vacuum at the second venturi.

* * * * *